(12) United States Patent
Morooka

(10) Patent No.: US 7,453,507 B2
(45) Date of Patent: Nov. 18, 2008

(54) ELECTRONIC IMAGING APPARATUS

(75) Inventor: Masaru Morooka, Akishima (JP)

(73) Assignee: Olympus Corporation, Tokyo (JP)

( * ) Notice: Subject to any disclaimer, the term of this patent is extended or adjusted under 35 U.S.C. 154(b) by 1087 days.

(21) Appl. No.: 10/857,955

(22) Filed: Jun. 2, 2004

(65) Prior Publication Data

US 2005/0030405 A1 Feb. 10, 2005

(30) Foreign Application Priority Data

Jun. 4, 2003 (JP) .............................. 2003-159671

(51) Int. Cl.
  *G02B 13/16* (2006.01)
  *G02B 15/14* (2006.01)
(52) U.S. Cl. ...................... 348/335; 359/680; 359/682; 359/689; 348/340; 348/341; 348/374
(58) Field of Classification Search ................ 348/335; 359/680–682, 689
  See application file for complete search history.

(56) References Cited

U.S. PATENT DOCUMENTS

| | | | |
|---|---|---|---|
| 6,124,987 A | 9/2000 | Kayanuma | |
| 6,308,011 B1 | 10/2001 | Wachi | |
| 6,822,808 B2 * | 11/2004 | Nanba et al. | 359/689 |
| 2003/0160902 A1 | 8/2003 | Mihara et al. | 348/676 |
| 2003/0193722 A1 | 10/2003 | Mihara et al. | 359/684 |
| 2003/0197952 A1 | 10/2003 | Mihara | 359/684 |
| 2003/0206352 A1 | 11/2003 | Nozawa et al. | 359/689 |

FOREIGN PATENT DOCUMENTS

| | | | |
|---|---|---|---|
| JP | 10-010013 | | 7/1999 |
| JP | 11-194274 | * | 7/1999 |
| JP | 11-287953 | * | 10/1999 |
| JP | 2000-009997 | * | 1/2000 |

* cited by examiner

*Primary Examiner*—Ngoo-Yen T. Vu
*Assistant Examiner*—Chia-Wei A Chen
(74) *Attorney, Agent, or Firm*—Kenyon & Kenyon LLP

(57) ABSTRACT

An electronic imaging apparatus of the present invention comprises a photographing optical system, in order from an object side, a first lens group having negative refracting power, which has a reflecting component having a reflecting surface for bending an optical path of an incident light from the object side and at least two positive lens groups arranged at an image side of the first lens group, wherein the photographing optical system is a zoom optical system and the following condition is satisfied:

$$-1.75 < f1/fw < -0.8$$

where f1 is a focal length of the first lens group, and fw is a focal length at the wide angle end at the photographing optical system.

39 Claims, 12 Drawing Sheets

SPHERICAL ABERRATION

ASTIGMATISM

DISTORTION

CHROMATIC ABERRATION OF MAGNIFICATION

SPHERICAL ABERRATION

ASTIGMATISM

DISTORTION

CHROMATIC ABERRATION OF MAGNIFICATION

SPHERICAL ABERRATION

ASTIGMATISM

DISTORTION

CHROMATIC ABERRATION OF MAGNIFICATION 435.84 — — — —
486.13 ———
656.27 --------
587.56 ———

SPHERICAL ABERRATION

ASTIGMATISM

DISTORTION

CHROMATIC ABERRATION OF MAGNIFICATION

SPHERICAL ABERRATION

ASTIGMATISM

DISTORTION

CHROMATIC ABERRATION OF MAGNIFICATION

SPHERICAL ABERRATION

ASTIGMATISM

DISTORTION

CHROMATIC ABERRATION OF MAGNIFICATION 435.84
486.13
656.27
587.56

ELECTRONIC IMAGING APPARATUS

This application claims priority to Japanese Patent Application No. 2003-159671 filed 4 Jun. 2003, the content of which is incorporated herein by reference in its entirety.

BACKGROUND OF THE INVENTION

1. Field of the Invention

This invention relates to a zoom lens and an electronic imaging apparatus using the same, particularly an electronic imaging apparatus including a video camera and a digital camera for which thinning of depth direction has been realized by devising an portion of the optical system of the zoom lens etc., and a zoom lens used in the same.

2. Description of the Related Art

In recent years, a digital camera (electronic camera) has attracted an attention as a next generation camera which replaces 35 mm-silver-haloid film (135 format) camera.

Furthermore, it has become many categories in wide range from a highly efficient type for business-use to a popular portable type.

Generally, the most unfavorable bottleneck in thinning a thickness of the depth direction of a camera is an optical system, particularly a thickness from a surface at utmost object side to an imaging surface.

Recently, a mainstream of technology for thinning a camera body is to adopt so-called collapsible type body, in which an optical system projects out of the camera body at a time of photographing, but the optical system is contained at a time of carrying.

There are examples of an optical system having a possibility that the thinning can be carried out effectively by adopting a collapsible type body, which have been disclosed in Publication of Unexamined Patent Application of Japan, such as Toku Kai Hei No.11-194274, No. Toku Kai Hei No.11-287953, Toku Kai Hei No.2000-9997, etc. These have, in order from an object side, a first group having negative refracting power, a second group having positive refracting power, wherein the first group and the second group move together at the time of zooming.

SUMMARY OF THE INVENTION

The electronic imaging apparatus according to the present invention comprises a photographing optical system comprising, in order from an object side, a first lens group having negative refracting power, which contains a reflecting component having a reflecting surface for bending an optical path of an incident light from the object side, and at least two positive lens groups having positive refracting power, arranged at an image side of the first lens group, wherein the photographing optical system is a zoom optical system, and wherein the following condition is satisfied:

$$-1.75 < f1/fw < -0.8$$

where f1 is a focal length of the first lens group, and fw is a focal length of the wide angle end at the photographing optical system. The electronic imaging apparatus according to the present invention comprises a photographing optical system comprising, in order from an object side, a first lens group having negative refracting power, which contains a reflecting component having a reflecting surface for bending an optical path of an incident light from the object side, and at least two positive lens groups having positive refracting power, arranged at an image side of the first lens group wherein the photographing optical system is a zoom optical system, and wherein a thickness of each lens on the optical axis comprised in the photographing optical system is 1/7 or more of the diagonal length of an imaging surface.

The electronic imaging apparatus according to the present invention comprises a photographing optical system comprising, in order from an object side, a first lens group having negative refracting power, which contains a reflecting component having a reflecting surface for bending an optical path of an incident light from the object side, and at least two positive lens groups having positive refracting power, arranged at an image side of the first lens group wherein the photographing optical system is a zoom optical system, and wherein the following condition is satisfied:

$$0.7 < f1/fT < -0.3$$

where f1 is a focal length of the first lens group and fT is a focal length at the telephoto end of the photographing optical system and it is a focal length at the telephoto end of the photographing optical system when the focal length is variable.

According to the present invention, it is composed such that by inserting a reflecting optical element such as a reflecting prism or the like at an object side, an optical path (optical axis) of an optical system, particularly a zoom lens system is bent, and furthermore conditions mentioned above are satisfied. By such composition, a camera which has no start-up time (a time for pushing out a lens holding body) which is seen in a camera using a collapsible type camera body and is desirable for waterproof and dust-protection, and has a very thin in depth can be realized, while keeping a high optical specification performance, such as a zoom ratio, an angle of view, F value and little aberration. Moreover, unlike other zoom optical systems such as a zoom lens system suitable for a collapsible-body type camera, according to the present invention, miniaturization and thinning of the camera using a miniaturized imaging element can be carried out advantageously when miniaturization of an imaging element progresses further from now on.

These and other features and advantages of the present invention will become apparent from the following detailed description of the preferred embodiments when taken in conjunction with the accompanying drawings.

BRIEF DESCRIPTION OF THE DRAWINGS

FIGS. 3A to 3D, 4E to 3H, and 3I to 4L are aberration diagrams showing spherical aberration, astigmatism, distortion and chromatic aberration of magnification at the wide angle end, the middle position and the telephoto end respectively, in the first embodiment.

FIG. 4 is a sectional view showing an optical arrangement developed along the optical axis when focusing of an object point at the wide angle end is carried out in a second embodiment according to the present invention.

DETAILED DESCRIPTION OF THE PREFERRED EMBODIMENTS

Figure 1:
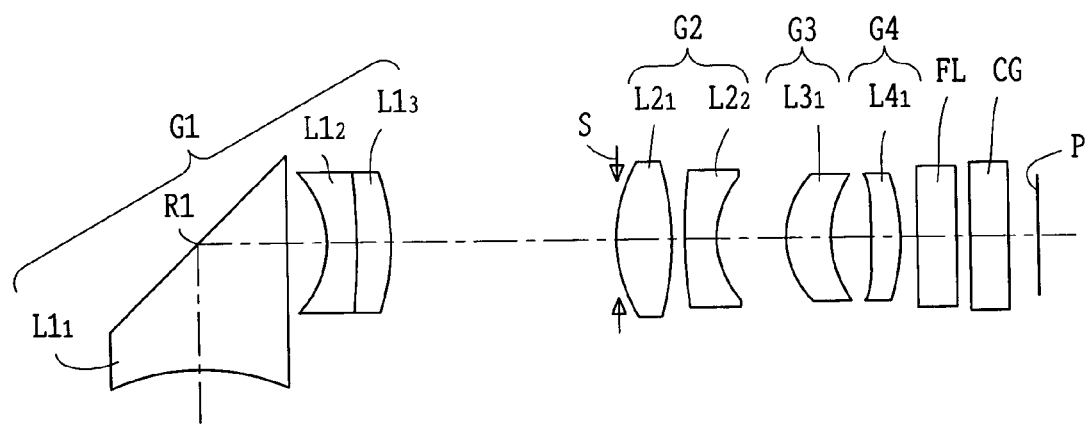
FIG. 1 is a sectional view showing an optical arrangement developed along the optical axis when focusing of an object point at the wide angle end is carried out in a first embodiment according to the present invention.

Prior to explaining embodiments, reasons why the composition of the present invention has been made as well as functions and advantages of the present invention will be explained.

The electronic imaging apparatus according to the present invention comprises a photographing optical system comprising, in order from an object side, a first lens group having negative refracting power, which contains a reflecting component having a reflecting surface for bending an optical path of an incident light from the object side, and at least two positive lens groups having positive refracting power, arranged at an image side of the first lens group, wherein the photographing optical system is a zoom optical system, and wherein the following condition is satisfied:

$$-1.75 < f1/fw < -0.8$$

where f1 is a focal length of the first lens group, and fw is a focal length at a wide angle end at the photographing optical system.

In order to make a depth of an optical system thin, while an incident surface of a lens system is directed toward an object side, it is desirable that bending of an optical path is carried out at utmost object side of a photographing optical system as much as possible and at a position where a light height is small. Considering that it is better that all the light heights contributing to an imaging near a bent portion is low, it is desirable to make the first lens group having the bent portion negative. By dividing positive refracting power by arranging at least two positive lens groups at an image side of the first lens group, a retro-focus type can be made as a whole. Thus, a wide angle of field can be achieved, while aberration is suppressed. Moreover, with respect to the condition mentioned above (1), in order to secure the length of optical path of a reflecting component somewhat long, it is necessary to arrange appropriately the refracting power of the first lens group having negative refracting power as shown in the condition (1). If f1/fw is less than the minimum limit of the condition (1), the power of the first lens group becomes strong. It is advantageous to keeping the length of optical path of the reflecting component, but correction of aberration at the wide angle end becomes difficult. If f1/fw exceeds the maximum limit of the condition (1), the power of the first lens group becomes weak, and it becomes difficult to secure the length of optical path of the reflecting component.

In the electronic imaging apparatus according to the present invention, it is desirable that refracting power at the object side rather than the reflecting surface has negative.

By such composition, a wide angle of field can be achieved without enlarging the reflecting surface since the retro-focus action of the whole photographing optical system can be much strengthened.

Moreover, in the electronic imaging apparatus according to the present invention, it is desirable that at least one the two positive lens groups mentioned above is movable on the optical axis.

By such composition, while zooming and focusing can be done, increase of the total length of lens system can be suppressed since movement of the lens groups is carried out at the image side of the position of the bent portion.

In the electronic imaging apparatus according to the present invention, it is desirable that zooming is carried out by moving both of the two positive lens groups along different locus on an optical path.

By such composition, mainly whole zoom groups are arranged behind the reflecting surface. Therefore, increase of the thickness of the optical system itself can be suppressed.

In the electronic imaging apparatus according to the present invention, it is desirable that the first lens group having negative refracting power remains fixed at the time of zooming. By such composition, it becomes possible to keep the total length of lenses constant at the time of zooming. Furthermore, by sharing zooming with two positive lens groups, zooming which keeps the total length of lenses constant from the wide angle end to the telephoto end can be carried out.

In the electronic imaging apparatus according to the present invention, it is desirable that both of the two positive lens groups are arranged at an object side at the telephoto end rather than at the wide angle end of the photographing optical system.

By such composition, it becomes advantageous for achieving high zooming ratio since zooming actions can be shared with both lenses. In order to secure an optical length of a reflecting component somewhat long, it is necessary to arrange appropriately the power of the first lens group having negative power as shown in the condition (1).

If f1/fw less than the minimum limit of the condition (1), the power of the first lens group becomes strong. It is advantageous to keep the optical length of the reflecting component, but correction of aberration at the wide angle end becomes difficult. If f1/fw exceeds the maximum limit of the condition (1), the power of the first lens group becomes weak. It becomes difficult to secure the optical length of the reflecting component.

In the electronic imaging apparatus according the present invention, an optical element at utmost object side has at least one ashperical surface.

If the total length of lenses is shortened, the refracting power of the first lens group having negative power becomes strong. Accordingly, correction of aberration becomes difficult. Therefore, it is desirable that an aspherical surface is formed on at least one of surfaces of the negative lens groups like the present invention. In particular, by using an aspherical surface for an optical element at utmost object side where a light off the axis is high, curvature of field and distortion are corrected well. Accordingly, correction of aberration of the whole system is carried out well.

In the electronic imaging apparatus according to the present invention, it is desirable that the optical element having the aspherical surface is composed of plastic material.

Thus, by composing such that the optical element having the aspherical surface is composed of plastic material, cost reduction can be attained.

In the electronic imaging apparatus according to the present invention it is desirable that a thickness on an optical axis of each lens in the photographing optical system is 1/7 or more of the diagonal length of an imaging surface.

By such composition, the thickness of peripheral portion of each lens can be secured, and stabilization of productivity can be attained well.

In the electronic imaging apparatus according to the present invention, it is desirable that the thickness on the optical axis of each lens comprised in the photographing optical system is 1/6 or more of the diagonal length of the imaging surface. Furthermore, it is desirable that the thickness of a lens is specified to 1/6 or more of the diagonal length of an imaging surface. By such composition, stabilization of productivity can be attained further well.

In the electronic imaging apparatus according to the present invention, it is desirable to have a lens group consisting of one positive lens element having at least one aspherical surface, arranged at utmost image side, besides the at least two positive lens groups. By such composition, in this positive lens, aberrations generated at the object side than this lens are offset each other, the correction of aberration in the whole system is carried out well. Therefore, it is desirable to use at least an aspherical surface for this lens for correction of aberration.

In the electronic imaging apparatus according to the present invention, it is desirable that the lens group arranged at utmost image side are made of plastic material.

By composing such that an aspherical lens is made of plastic material, cost reduction can be attained.

In the electronic imaging apparatus according to the present invention, it is desirable that the lens group arranged at utmost image side satisfies the following condition (2).

$$6 < f4/fw < 40 \quad (2)$$

where f4 is a focal length of the lens group at utmost image side, and fw is a focal length of the photographing optical system at the wide angle end.

In order to carry out correction of aberration well in the whole system, it is desirable that the power of the lens group at utmost image side is arranged appropriately as shown in the condition (2). If f4/fw is less than the minimum limit of this condition (2), the power of the lens group at utmost image side becomes strong and large aberration occurs in this lens group. This is advantageous to correction of aberration in the whole lens system, but degradation of aberration to decentering becomes large. On the other hand, if f4/fw exceeds the maximum limit of this condition, the power of the lens group at utmost image side becomes weak, and aberration generated in this lens group becomes small. Therefore, correction of aberration in the whole lens system becomes difficult.

In the electronic imaging apparatus according to the present invention, it is desirable that the number of lenses contained in one positive lens group of the two positive lens groups are only two, which consists of a negative lens element and a positive lens element, and the number of lens contained in the other positive lens group is one, which consists of only one positive lens. In such composition, by composing such that one positive lens group is composed of two lenses which are a positive lens and a negative lens, whereby chromatic aberrations are generated each other, and the chromatic aberrations can be corrected mutually. By this, even if one of the positive lens groups of another part is composed of a single lens, degradation of image forming performance can be suppressed.

In the electronic imaging apparatus according to the present invention, it is desirable that one positive lens group of the two positive lens groups is arranged directly behind an image side of the first lens group, and the lenses contained are composed of two lens elements which are arranged, in order from an object side, a positive lens element having a convex surface directed toward the object side and a negative lens element having a concave surface directed toward the image side.

In such composition, it is desirable that a positive lens and a negative lens are arranged, in order from the object side, in the second lens group in order to secure the back focus at the wide angle end. It is better that a surface at the object side of the positive lens is formed to be a convex surface directed toward the object side for correcting spherical aberration, and a surface at the image side of the negative lens is formed to be a concave surface directed toward the image side for correcting curvature of field.

The electronic imaging apparatus according to the present invention includes a photographing optical system comprising, in order from an object side, a first lens group having negative refracting power, which contains a reflecting component having a reflecting surface for bending an optical path of an incident light from the object side, and at least two positive lens groups arranged at an image side from the first lens group, wherein the photographing opticla system is a zoom optical system and a thickness of each lens on the optical axis, which is contained in the photographing optical system is 1/7 or more than the diagonal length of an imaging surface.

In the electronic imaging apparatus equipped with the photographing optical system of the present invention, the thickness of each lens on the optical axis in the photographing optical system can be set to 1/7 or more than the diagonal length of an imaging surface without limiting [−1.75<f1/fw<−0.8] in the condition (1). In this way, the thickness of peripheral portion of each lens can be secured, and the stability of productivity can be improved. The photographing optical system can be also a single focus composition.

In the electronic imaging apparatus according to the present invention, it is desirable that the object side rather than the reflecting surface has negative refracting power.

In the electronic imaging apparatus according to the present invention, it is desirable that at least one of the two positive lens groups is movable on the optical axis.

In the electronic imaging apparatus according to the present invention, it is desirable that zooming is carried out by moving both of the two positive lens groups along different locus on the optical path.

In the electronic imaging apparatus according to the present invention, it is desirable that the first lens group having negative refracting power remains fixed at the time of zooming.

In the electronic imaging apparatus according to the present invention, it is desirable that both of the two positive lens groups are arranged nearer to the object side at the telephoto end rather than at the wide angle end of the photographing optical system.

In the electronic imaging apparatus according to the present invention is desirable that an optical element at utmost object side has at least one aspherical surface.

In the electronic imaging apparatus according to according to the present invention is desirable that the optical element having aspherical surface is composed of plastic material.

In the electronic imaging apparatus according to the present invention is desirable that a thickness of each lens on the optical axis contained in the photographing optical system is ⅙ or more than the diagonal length of an imaging surface.

In the electronic imaging apparatus according to the present invention is desirable that it has a lens group consisting of only one positive lens element having at least one aspherical surface, arranged at utmost image side, besides at least the two positive lens groups.

In the electronic imaging apparatus according to the present invention, it is desirable that the lens group arranged at utmost image side is composed of plastic material.

In the electronic imaging apparatus according to the present invention, it is desirable that the lens group arranged at utmost image side satisfies the following condition (3).

$$6 < f4/fw < 40 \tag{3}$$

where f4 is a focal length of the lens group arranged at utmost image side, and fw is a focal length at the wide angle end of the photographing optical system.

In the electronic imaging apparatus according to the present invention, it is desirable that the number of lenses contained in one of the two positive lens groups is only two which consists of only a negative lens element and a positive lens element, and the number of lenses contained in one of the other positive lens groups is only one which consists of a positive lens element.

In the electronic imaging apparatus according to the present invention, it is desirable that one of the two positive lens groups is arranged directly behind an image side of the first lens group, and lenses contained in it is composed such that they are arranged, in order from an object side, a positive lens element having a convex surface directed toward the object side and a negative lens element having a concave surface directed toward the image side.

In the electronic imaging apparatus according to the present invention, it is desirable that the reflecting component having the reflecting surface is a prism, and the following condition (4) is satisfied.

$$1.5 < PD/L < 5.0 \tag{4}$$

where PD is a length of an optical path of the prism and L is the diagonal length of an effective imaging area of an imaging surface.

In a photographing optical system having bent optical path, it is desirable that an optical path is bent in the horizontal direction of an electronic imaging apparatus, such as a camera. If it is bent to the vertical direction, a camera becomes to be big-sized since the height direction of the camera cannot be made low. In order to bend a reflecting component in the horizontal direction of the camera, it is necessary to arrange the length of optical path of the reflecting component appropriately so as to comply with the condition (4). If PD/L is less than the minimum limit of the condition (4), the length of optical path of a prism becomes short, and the length of optical path of bent portion by the prism in the direction of an elongated side of an imaging surface cannot be secured. If PD/L exceeds the maximum limit of the condition (4), correction of aberration in the whole system becomes difficult since the length of optical path of the prism becomes long and accordingly the power of the first lens group becomes strong.

In the electronic imaging apparatus according to the present invention, it is desirable that the following condition (5) is satisfied.

$$-0.7 < f1/fT < -0.3 \tag{5}$$

where f1 is a focal length of the first lens group, and fT is a focal length of a photographing optical system and it is a focal length at telephoto end of the photographing optical system when a focal length is variable.

This is standardized condition of the first lens group at the telephoto end of the photographing optical system, and it is similar to such expression of the condition (1) as "−1.75<f1/fw<−0.8". It is the condition for securing the length of optical path of the reflecting component and keeping a balance of correction of aberration.

The electronic imaging apparatus according to the present invention includes a photographing optical system comprising, in order from an object side, a first lens group having negative refracting power, which includes a reflecting component having a reflecting surface for bending an optical path of an incident light from the object side, and at least two positive lens groups having positive refracting power, arranged at an image side of the first lens group, wherein the following condition is satisfied:

$$-0.7 < f1/fT < -0.3$$

where f1 is a focal length of the first lens group, and fT is a focal length of the photographing optical system and it is a focal length at the telephoto end of the photographing optical system when the focal length is variable.

Here, [−1.75<f1/fw<−0.8] of the condition (1) can be replaced by [−0.7<f1/fT<−0.3] of the condition (6).

This is a term expressing the focal length of the first lens group at the telephoto end and the condition for making easy to securing the length of optical path of the reflecting component, and keeping balance of correction of aberration. In the electronic imaging apparatus according to the present invention, it is desirable that the following condition (7) is satisfied.

$$-1.70 < f1/fw < -1.20 \tag{7}$$

where f1 is a focal length of the first lens group, and fw is a focal length of a photographing optical system, and it is the focal length at the wide angle end of the photographing optical system when a focal length is variable.

Thereby, it becomes easier to exercise an effect of the condition, and also it is easier to secure an optical path length and to keep the balance of correction of aberration. Only one of the maximum limit or the minimum limit of the condition (7) can also be limited.

In the electronic imaging apparatus according to the present invention having a lens group arranged at utmost image side, besides the at least two positive lens group, it is desirable that the lens group arranged at utmost image side satisfies the following condition.

$$9 < f4/fw < 25 \tag{8}$$

where f4 is a focal length of the lens group at utmost image side, and fw is a focal length of the photographing optical system at the wide angle end.

By such composition, it becomes easier to exercise an effect of the condition, and also it is easier to keep the balance between aberration performance and influence by decentering of the last lens group. Moreover, only one of the maximum limit or the minimum limit of the condition (8) can also be limited.

In the electronic imaging apparatus according to the present invention, it is desirable that the reflecting component having a reflecting surface is a prism, and the following condition (9) is satisfied:

$$1.5 < PD/L < 5.0 \quad (9)$$

where PD is a length of an optical path of the prism and L is the diagonal length of an effective imaging surface of an imaging apparatus.

By such composition, the effect of the condition can easily exercised and a layout which enables to shorten the lengthwise direction of a camera can easily be achieved.

In the electronic imaging apparatus according to the present invention, it is desirable that the following condition (10) is satisfied.

$$-0.6 < f1/fT < -0.45 \quad (10)$$

where f1 is a focal length of the first lens group, and fT is a focal length of the photographing optical system and it is a focal length at the telephoto end of the photographing optical system when the focal length is variable.

By such composition, effects mentioned above can easier obtained and it is also easier to keep the balance between securing an optical path length of the reflecting component and correction of aberration. Also, it becomes easier to the keep balance between securing of the optical path length and correction of aberration. Only one of the maximum limit or the minimum limit of the condition (10) can also be limited.

In the electronic imaging apparatus according to the present invention having a lens group arranged at utmost image side, besides the at least two positive lens groups, it is desirable that the lens group arranged at utmost image side satisfies the following condition:

$$2 < f1/fT < 14 \quad (11)$$

where f1 is a focal length of the first lens group, and fT is a focal length of the photographing optical system and it is the focal length at the telephoto end of the photographing optical system when the focal length is variable.

This is substitution for "6<f4/fw<40" in the condition (4), which is the condition for keeping the balance between aberration performance and influence by decentering in a lens group arranged at utmost image side.

In the electronic imaging apparatus according to the present invention, it is desirable that it comprises, in order from the object side, the first lens group having negative refracting power, which remains fixed at the time of zooming, a second lens group having positive refracting power, which moves on an optical axis at the time of zooming, a third lens group having positive refracting power which moves on the optical axis at the time of zooming, a fourth lens group having positive refracting power, which remains fixed at the time of zooming, and an optical filter, wherein the second lens group and the third lens group are said at least two positive lens groups.

By such composition, movable groups at the time of zooming can be limited only to two. Particularly, as the second lens group and the third lens group are arranged adjacent to each other, move mechanisms, such as a cam for making it move, can be easily communalized.

In the electronic imaging apparatus according to the present invention, is desirable that focusing is carried out by moving only the third lens group among the lens groups mentioned above.

By such way, the composition can become simple since two movable lenses only can be movable group for zooming and focusing.

Hereafter, embodiments of the present invention will be explained using drawings.

THE FIRST EMBODIMENT

Figure 2A:
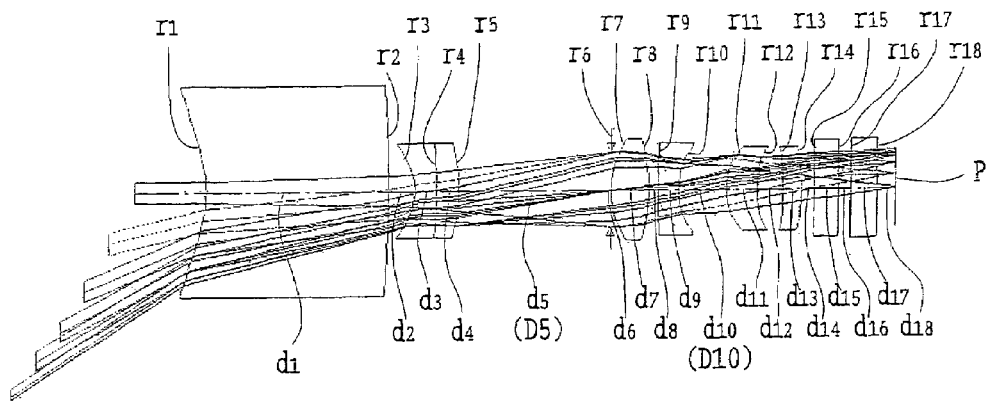
FIGS. 2A, 2B and 2C are sectional views showing an optical arrangement developed along the optical axis at the wide angle end, the middle position and the telephoto end respectively, in the first embodiment according to the present invention.
Figure 2B:
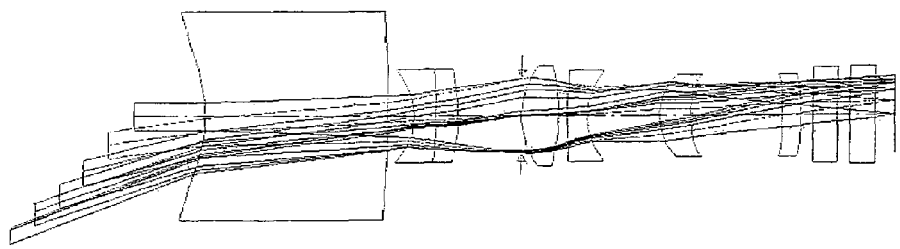
Figure 2C:
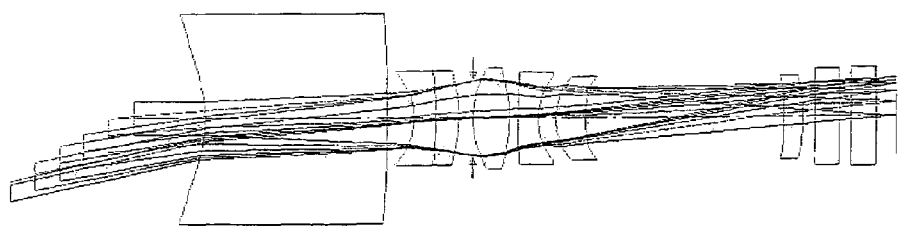
Figure 3A:
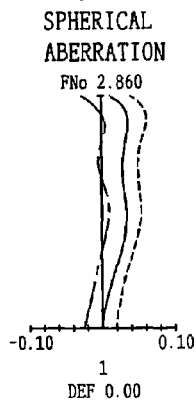
Figure 3B:
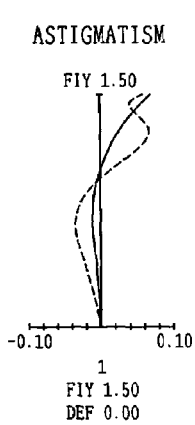
Figure 3C:
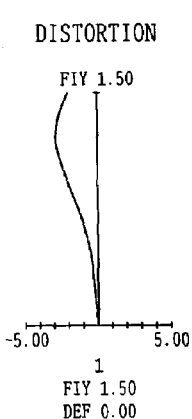
Figure 3D:
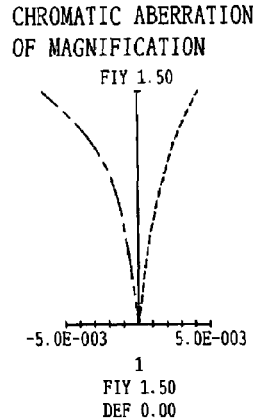
Figure 3E:
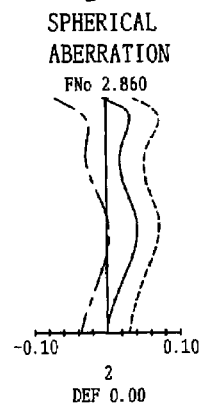
Figure 3F:
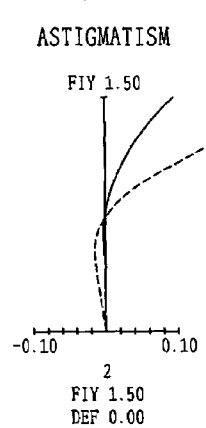
Figure 3G:
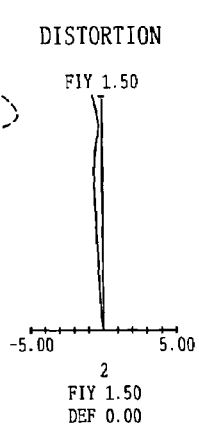
Figure 3H:
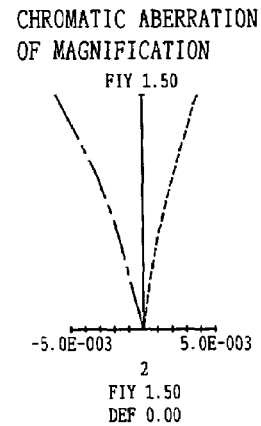
Figure 3I:
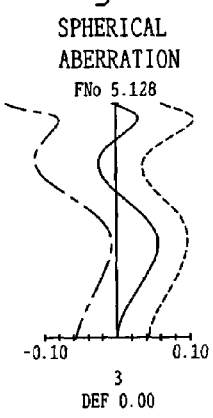
Figure 3J:
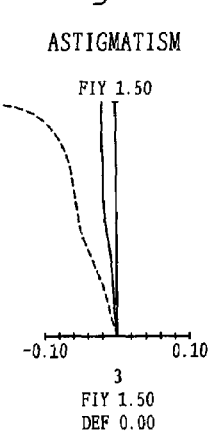
Figure 3K:
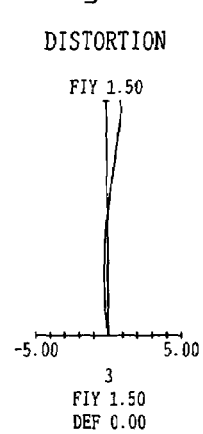
Figure 3L:
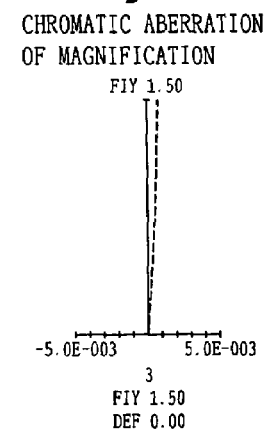

FIG. 1 is a sectional view showing an optical arrangement developed along the optical axis when focusing of an object point at the wide angle end is carried out at the time of bending the optical path in the first embodiment of the zoom lens used in the electronic imaging apparatus according to the present invention. FIGS. 2A, 2B and 2C are sectional views showing an optical arrangement developed along the optical axis when focusing of an object point is carried out at the wide angle end, the middle position and the telephoto end respectively, of the zoom lens in the first embodiment according to the present invention. FIGS. 3A to 3D, 3E to 3H, and 3I to 3L are aberration diagrams showing spherical aberration, astigmatism, distortion and chromatic aberration of magnification when focusing of the object point is carried out at the wide angle end, the middle position and the telephoto end respectively, of the zoom lens in the first embodiment.

The electronic imaging apparatus of the first embodiment comprises, in order from an object side, a zoom lens and CCD that is an electronic imaging element, as shown in FIG. 1. P is an imaging surface of CCD in FIG. 1. Between the zoom lens and the imaging surface P, optical elements FL and CG having flat-plate shape are arranged. The optical element FL is a low pass filter on which multilayer coating for cutting rays of infrared and ultraviolet region is made. An optical element CG is a cover glass of CCD.

The zoom lens has, in order from an object side, a first lens group G1, an aperture stop S, a second lens group G2, a third lens group G3 and a 4th lens group G4.

The first lens group G1 has, in order from the object side, a secondary group at front side, a reflecting optical element R1 for bending an optical path, and a secondary group at backside having negative refracting power, and it has negative refracting power as a whole. The secondary group at front side is composed of a negative meniscus lenses $L1_1$, having a concave surface directed toward to the object side. The secondary group at backside is composed of a cemented lens having negative refracting power as a whole, in which a negative lens $L1_2$ having a concave surface directed toward the object side and a negative lens $L1_3$ having a convex surface directed toward an image side are arranged in order from the object side. The reflecting optical element R1 is constituted as a reflecting prism for bending the optical path by 90°. The direction of bending in each embodiment of the present invention is transverse direction.

The second lens group G2 has, in order from the object side, a positive lens $L2_1$ having double convex surfaces and a negative meniscus lens $L2_2$ having a concave surface directed toward the image side, and it has positive refracting power as a whole.

The third lens group G3 is composed of a positive meniscus lens $L3_1$ having a convex surface toward the object side.

The fourth lens group G4 is composed of a negative meniscus lens $L4_1$ having a concave surface toward the object side. The aperture stop S is arranged directly before the second lens group G2.

In case that zooming is carried out from the wide angle end to the telephoto end at the time of focusing an object point, positions of the first lens group and the fourth lens group remain fixed, and the second lens group moves only to the object side together with the aperture stop S, and the third lens group moves only to the object side so as to reduce the distance to the second lens group G2 after the third lens group has expanded once a distance to the second lens group G2.

At the time of focusing operation, the third lens group G3 moves on the optical axis. The position of the fourth lens group G4 remains fixed at the time of focusing operation also.

An aspherical surface is formed on a surface at the object side of the negative meniscus lens $L1_1$ having a concave surface directed toward the object side in the first lens group G1, a surface at the object side of the positive lens $L2_1$ having double convex surfaces directed toward the object side in the second lens group G2, both surfaces of the lens $L3_1$ in the third lens group G3 and both surfaces of the lens $L4_1$ in the fourth lens group G4.

Next, numerical data of optical elements composing the zoom lens of the first embodiment are shown.

In the numerical data, $r_1$, $r_2$, - - - denote radii of curvature of individual lens surfaces; $d_1$, $d_2$, - - - denote thickness of individual lenses or air space between them; $n_{d1}$, $n_{d2}$, - - - denote refractive indices of individual lenses at the d line; $v_{d1}$, $v_{d2}$, - - - denote Abbe's numbers of individual lenses; Fno. denotes an F number; f denotes the total focal length of the zoom lens, and D0 denotes the distance from an object to the first lens surface.

When z is taken as the coordinate in the direction of the optical axis, y is taken as the coordinate orthogonal to the optical axis, K as a conic constant, and $A_4$, $A_6$, $A_8$, $A_{10}$, as aspherical coefficients, the configuration of each of the aspherical surfaces is expressed by the following equation:

$$Z = (y^2/r)/[1+\{1-(1+K)(y/r)^2\}^{1/2}] + A_4 y^4 + A_6 y^6 + A_8 y^8 + A_{10} y^{10}$$

These symbols are commonly used in the embodiments to be described later.

These symbols are commonly used in the embodiments to be described later.

Numerical data 1
focal length: f = 2.510-7.257 mm,
full angle of field: 2ω° = 62.889 degrees - 23.082 degrees,
F number: Fno = 2.86-5.13

| | | | |
|---|---|---|---|
| $r_1$ = -5.140 (aspherical surface) | $d_1$ = 7.40 | $n_{d1}$ = 1.50913 | $v_{d1}$ = 56.20 |
| $r_2$ = -80.000 | $d_2$ = 1.06 | | |
| $r_3$ = -3.004 | $d_3$ = 0.86 | $n_{d3}$ = 1.68597 | $v_{d3}$ = 56.50 |
| $r_4$ = -27.698 | $d_4$ = 0.91 | $n_{d4}$ = 1.84666 | $v_{d4}$ = 23.78 |
| $r_5$ = -7.760 | $d_5$ = D5 | | |
| $r_6$ = ∞ (aperture stop) | $d_6$ = 0.00 | | |
| $r_7$ = 3.500 (aspherical surface) | $d_7$ = 1.51 | $n_{d7}$ = 1.74330 | $v_{d7}$ = 49.33 |
| $r_8$ = -8.674 | $d_8$ = 0.37 | | |
| $r_9$ = 38.10 | $d_9$ = 0.80 | $n_{d9}$ = 1.84666 | $v_{d9}$ = 23.78 |
| $r_{10}$ = 2.887 | $d_{10}$ = D10 | | |
| $r_{11}$ = 2.919 (aspherical surface) | $d_{11}$ = D11 | | |
| $r_{12}$ = 6.350 (aspherical surface) | $d_{12}$ = D12 | | |
| $r_{13}$ = -23.259 (aspherical surface) | $d_{13}$ = 0.80 | $n_{d13}$ = 1.50913 | $v_{d13}$ = 56.20 |
| $r_{14}$ = -9.555 (aspherical surface) | $d_{14}$ = 0.50 | | |
| $r_{15}$ = ∞ | $d_{15}$ = 1.00 | $n_{d15}$ = 1.51633 | $v_{d15}$ = 64.14 |
| $r_{16}$ = ∞ | $d_{16}$ = 0.50 | | |
| $r_{17}$ = ∞ | $d_{17}$ = 1.00 | $n_{d17}$ = 1.51633 | $v_{d17}$ = 64.14 |
| $r_{18}$ = ∞ | $d_{18}$ = D18 | | |

P = imaging surface
Aspherical surface coefficient

The first surface

K = 0
$A_2$ = 0  $A_4$ = 5.11750 × 10$^{-3}$  $A_6$ = -1.95540 × 10$^{-4}$
$A_8$ = 1.07260 × 10$^{-5}$  $A_{10}$ = -2.16040 × 10$^{-7}$

The seventh surface

K = 0
$A_2$ = 0  $A_4$ = -4.41031 × 10$^{-3}$  $A_6$ = 3.03687 × 10$^{-4}$
$A_8$ = -2.57216 × 10$^{-4}$  $A_{10}$ = 3.90137 × 10$^{-5}$

The eleventh surface

K = 0
$A_2$ = 0  $A_4$ = -3.95954 × 10$^{-4}$  $A_6$ = 3.96583 × 10$^{-3}$
$A_8$ = -3.00369 × 10$^{-4}$

The twelfth surface

K = 0
$A_2$ = 0  $A_4$ = 7.35546 × 10$^{-3}$  $A_6$ = 6.44535 × 10$^{-3}$
$A_8$ = -1.40359 × 10$^{-4}$

The thirteenth surface

K = 0
$A_2$ = 0  $A_4$ = -4.95977 × 10$^{-3}$  $A_6$ = 8.04823 × 10$^{-3}$
$A_8$ = -3.11898 × 10$^{-3}$

The fourteenth surface

K = 0
$A_2$ = 0  $A_4$ = -5.50165 × 10$^{-3}$  $A_6$ = 1.03146 × 10$^{-2}$
$A_8$ = -3.42245 × 10$^{-3}$

Zoom data: zoom distances at the time of focusing
I0 = 1500

| Zoom distance | f = 2.510<br>2ω = 62.889<br>Fno. = 2.86 | f = 4.270<br>2ω = 38.892<br>Fno. = 3.68 | f = 7.257<br>2ω = 23.082<br>Fno. = 5.13 |
|---|---|---|---|
| D5 | 6.28 | 2.63 | 0.60 |
| D10 | 1.98 | 2.96 | 0.71 |
| D12 | 1.05 | 3.71 | 7.99 |

Next, values such as a parameter of the conditions in the embodiment mentioned above are shown.

| | |
|---|---|
| fw: The focal length at the wide angle end | 2.510 |
| fT: The focal length at the telephoto end | 7.257 |
| f1: The focal length of the first group | -4.188 |
| f2: The focal length of the second group | 7.846 |
| f3: The focal length of the third group | 9.477 |
| f4: The focal length | 31.240 |

-continued

| | |
|---|---|
| of the 4th group | |
| L: The diagonal length of effective-imaging-area | 3.0 |
| PD: The length of optical path of a prism | 7.400 |
| f1/fw | −1.67 |
| f4/fw | 12.44 |
| PD/L | 2.47 |
| f1/fT | −0.58 |
| f4/fT | 4.30 |

THE SECOND EMBODIMENT

Figure 4:
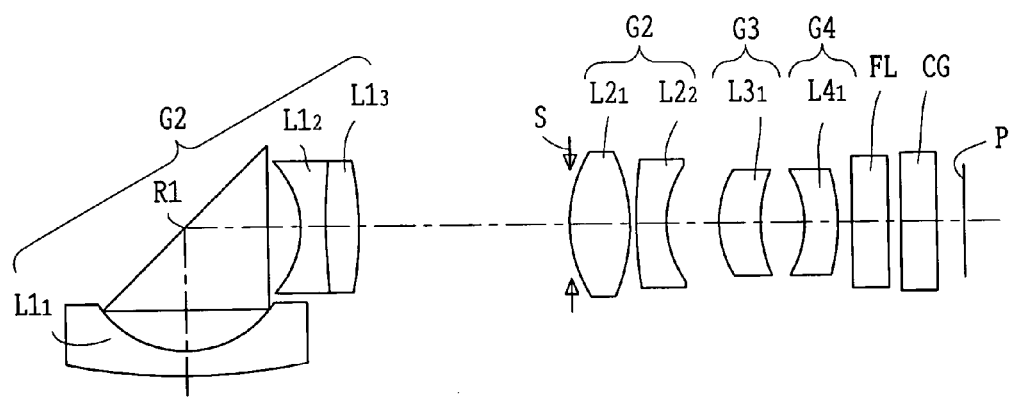
Figure 5A:
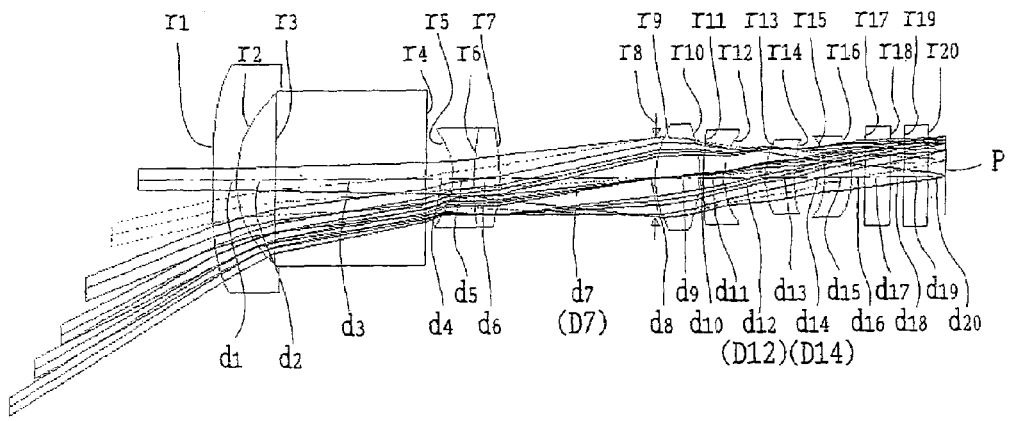
FIGS. 5A, 5B and 5C are sectional views showing an optical arrangement developed along the optical axis at the wide angle end, the middle position and the telephoto end respectively, in the second embodiment according to the present invention.
Figure 5B:
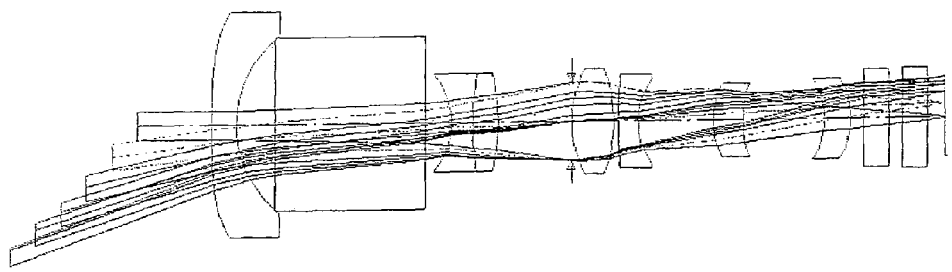
Figure 5C:
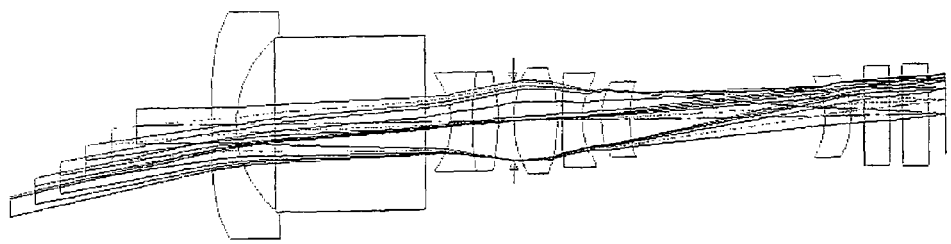
Figure 6A:
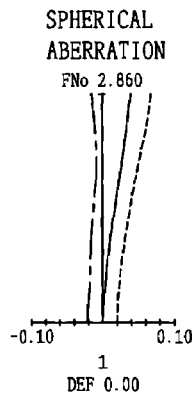
FIGS. 6A to 6D, 6E to 6H, and 6I to 6L are aberration diagrams showing spherical aberration, astigmatism, distortion and chromatic aberration of magnification at the wide angle end, the middle position and the telephoto end respectively, in the second embodiment.
Figure 6B:
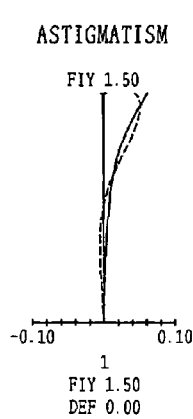
Figure 6C:
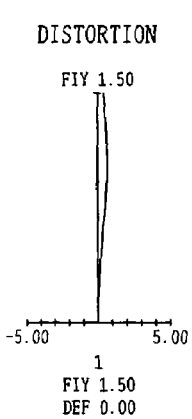
Figure 6D:
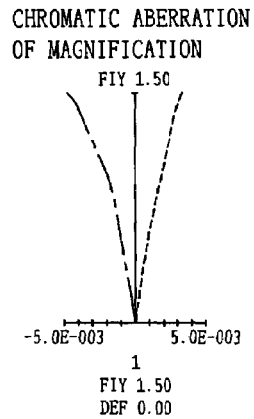
Figure 6E:
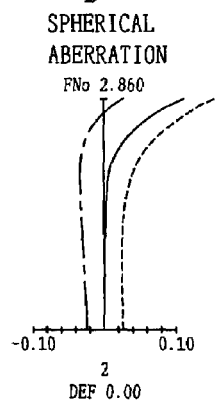
Figure 6F:
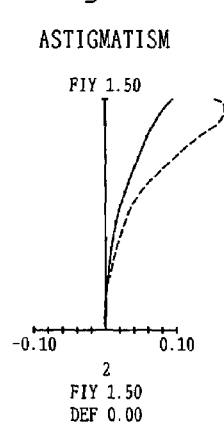
Figure 6G:
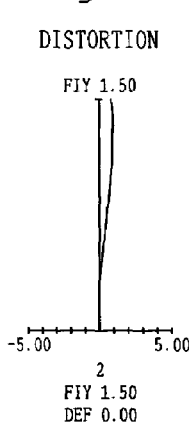
Figure 6H:
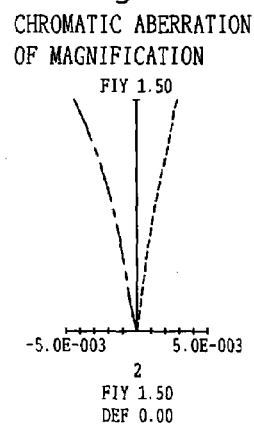
Figure 6I:
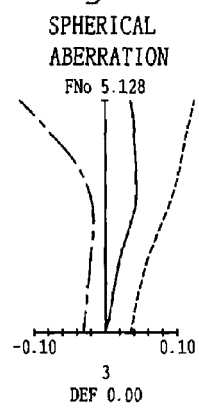
Figure 6J:
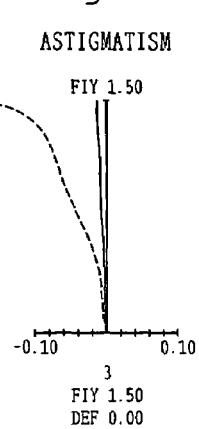
Figure 6K:
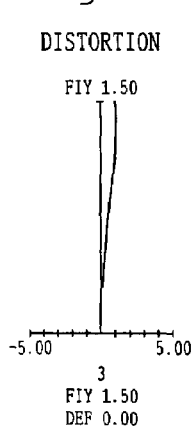
Figure 6L:
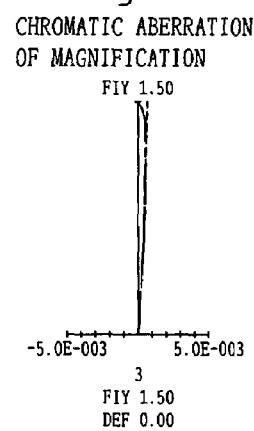

FIG. 4 is a sectional view showing an optical arrangement developed along the optical axis when focusing of an object point at the wide angle end is carried out at the time of bending the optical path in the second embodiment of the zoom lens used in the electronic imaging apparatus according to the present invention. FIGS. 5A, 5B and 5C are sectional views showing an optical arrangement developed along the optical axis when focusing of an object point is carried out at the wide angle end, the middle position and the telephoto end respectively, of the zoom lens in the second embodiment according to the present invention. FIGS. 6A to 6D, 6E to 6H, and 6I to 6L are aberration diagrams showing spherical aberration, astigmatism, distortion and chromatic aberration of magnification when focusing of an object point is carried out at the wide angle end, the middle position and the telephoto end respectively, of the zoom lens in the second embodiment.

The electronic imaging apparatus of the second embodiment has in order from an object side, a zoom lens and CCD that is an electronic imaging element, as shown in FIG. 4. P is an imaging surface of CCD in FIG. 4. Between the zoom lens and the imaging surface P, optical elements FL and CG having flat-plate like shape are arranged. The optical element FL is a low pass filter on which multilayer coating for cutting rays of infrared and ultraviolet region is made. The optical element CG is a cover glass of CCD.

A zoom lens has, in order from an object side, a first lens group G1, an aperture stop S, a second lens group G2, a third lens group G3 and a 4th lens group G4.

The first lens group G1 has, in order from the object side, a secondary group at front side, a reflecting optical element R1 for bending an optical path, and a secondary group at backside having negative refracting power, and it has negative refracting power as a whole. The secondary group at front side is composed of a negative meniscus lenses $L1_1$, having a convex surface directed toward to the object side. The secondary group at backside is composed of a cemented lens having negative refracting power as a whole, in which a negative lens $L1_2$ having a concave surface directed toward the object side and a positive lens $L1_3$ having double convex surfaces are arranged in order from the object side. The reflecting optical element R1 is constituted as a reflecting prism for bending the optical path by 90°.

The second lens group G2 has, in order from the object side, a positive lens $L2_1$ having double convex surfaces and a negative meniscus lens $L2_2$ having a convex surface directed toward the object side, and it has positive refracting power as a whole.

The third lens group G3 is composed of a positive meniscus lens $L3_1$ having a convex surface toward the object side. The fourth lens group G4 is composed of a negative meniscus lens $L4_1$ having a concave surface toward the object side.

In case that zooming is carried out from the wide angle end to the telephoto end at the time of focusing an object point, positions of the first lens group and the fourth lens group remain fixed, and the second lens group moves only to the object side together with the aperture stop S, and the third lens group moves only to the object side so as to reduce the distance to the second lens group G2, after the third lens group has expanded once a distance to the second lens group G2

At the time of focusing operation, the third lens group G3 moves on the optical axis.

The position of the fourth lens group G4 remains fixed at the time of focusing operation also.

An aspherical surface is formed on a surface at the object side of the negative meniscus lens $L1_1$ having a concave surface directed toward the object side in the first lens group G1, a surface at the object side of the positive lens $L2_1$ having double convex surfaces directed toward the object side in the second lens group G2, both surfaces of the positive meniscus lens $L4_2$ in the third lens group G3 and both surfaces of the negative meniscus lens $L4_4$ in the fourth lens group G4.

Next, numerical data of optical elements composing the zoom lens of the second embodiment are shown.

Numerical data 2
Focal length: f = 2.510-7.260,
F number: Fno = 2.86-5.06,
Full angle of field: 2ω = 61.569°-23.169°

| | | | |
|---|---|---|---|
| $r_1$ = 100.000 (aspherical surface) | $d_1$ = 1.00 | $n_{d1}$ = 1.50913 | $v_{d1}$ = 56.20 |
| $r_2$ = 4.784 | $d_2$ = 1.53 | | |
| $r_3$ = ∞ | $d_3$ = 6.0 secon | $d_3$ = 1.84666 | $v_{d3}$ = 23.78 |
| $r_4$ = ∞ | $d_4$ = 1.07 | | |
| $r_5$ = −3.302 | $d_5$ = 0.81 | $n_{d5}$ = 1.72000 | $v_{d5}$ = 41.98 |
| $r_6$ = 13. 809 | $d_6$ = 1.04 | $n_{d6}$ = 1.80518 | $v_{d6}$ = 25.42 |
| $r_7$ = −9.057 | $d_7$ = D7 | | |
| $r_8$ = ∞ (aperture stop) | $d_8$ = 0.00 | | |
| $r_9$ = 3.865 (aspherical surface) | $d_9$ = 1.75 | $n_{d9}$ = 1.74330 | $v_{d9}$ = 49.33 |
| $r_{10}$ = −6.357 | $d_{10}$ = 0.18 | | |
| $r_{11}$ = 25.192 | $d_{11}$ = 0.81 | $n_{d11}$ = 1.84666 | $v_{d11}$ = 23.78 |
| $r_{12}$ = 3.161 | $d_{12}$ = D12 | | |
| $r_{13}$ = 3.607 (aspherical surface) | $d_{13}$ = 1.17 | $n_{d13}$ = 1.50913 | $v_{d13}$ = 56.20 |
| $r_{14}$ = 7.169 (aspherical surface) | $d_{14}$ = D14 | | |
| $r_{15}$ = −3.984 (aspherical surface) | $d_{15}$ = 1.09 | $n_{d15}$ = 1.50913 | $v_{d15}$ = 56.20 |
| $r_{16}$ = −3.661 (aspherical surface) | $d_{16}$ = 0.51 | | |
| $r_{17}$ = ∞ | $d_{17}$ = 1.00 | $n_{d17}$ = 1.51633 | $v_{d17}$ = 64.14 |
| $r_{18}$ = ∞ | $d_{18}$ = 0.50 | | |
| $r_{19}$ = ∞ | $d_{19}$ = 1.00 | $n_{d19}$ = 1.51633 | $v_{d19}$ = 64.14 |
| $r_{20}$ = ∞ | $d_{20}$ = D20 | | | p = ∞ imaging surface
Aspherical surface coefficient

The first surface

K = 0
$A_2$ = 0   $A_4$ = 1.68680 × $10^{-3}$   $A_6$ = −5.48760 × $10^{-5}$
$A_8$ = 2.11970 × $10^{-6}$   $A_{10}$ = −2.66390 × $10^{-8}$

The ninth surface

K = 0
$A_2$ = 0   $A_4$ = −4.54769 × $10^{-3}$   $A_6$ = −2.79490 × $10^{-4}$
$A_8$ = −1.77124 × $10^{-6}$   $A_{10}$ = −7.27081 × $10^{-8}$

The thirteenth surface

K = 0
$A_2$ = 0   $A_4$ = −4.07028 × $10^{-4}$   $A_6$ = 1.74078 × $10^{-3}$

-continued

Numerical data 2
Focal length: f = 2.510-7.260,
F number: Fno = 2.86-5.06,
Full angle of field: 2ω = 61.569°-23.169°

The fourteenth surface $K = 0$
$A_2 = 0$     $A_4 = 4.95103 \times 10^{-3}$     $A_6 = 1.55976 \times 10^{-3}$
$A_8 = 1.70662 \times 10^{-3}$ The fifteenth surface $K = 0$
$A_2 = 0$     $A_4 = 6.94193 \times 10^{-3}$     $A_6 = 1.31103 \times 10^{-4}$
$A_8 = -3.08182 \times 10^{-3}$ The sixteenth surface $K = 0$
$A_2 = 0$     $A_4 = 8.55583 \times 10^{-3}$     $A_6 = 1.81846 \times 10^{-4}$
$A_8 = -1.62968 \times 10^{-3}$ Zoom data: The zoom distances at the time of focusing.
I0 = 1500

| zoom distance | f = 2.510<br>2ω = 61.569<br>Fno. = 2.86 | f = 4.270<br>2ω = 38.418<br>Fno. = 3.74 | f = 7.260<br>2ω = 23.169<br>Fno. = 55.06 |
|---|---|---|---|
| D7 | 6.27 | 2.91 | 0.60 |
| D12 | 1.59 | 2.97 | 0.79 |
| D14 | 1.21 | 3.19 | 7.68 |

Next, values, such as a parameter of the conditions in the embodiment mentioned above, are shown.

| | |
|---|---|
| fw: focal length at the wide angle end | 2.510 |
| ft: focal length at the telephoto end | 7.260 |
| f1: focal length of the first group | −3.938 |
| f2: focal length of the second group | 6.845 |
| f3: focal length of the third group | 12.836 |
| f4: focal length of the fourth group | 41.497 |
| L: diagonal length of effective imaging area | 3.0 |
| PD: optical length of glass of prism | 6.015 |
| f1/fw | −1.57 |
| f4/fw | 16.53 |
| PD/L | 2.01 |
| f1/fT | −0.54 |
| f4/fT | 5.72 |

In each embodiment of the present invention, in each case the direction of bending is elongated side direction (horizontal direction) of the electronic imaging element (CCD) as mentioned above. If it is composed such that an optical path is bent toward a short side direction (vertical direction), it is advantageous to miniaturization since a space for bending can be small. Nevertheless, if it is composed such that bending is possible also toward the elongated direction, it is possible to comply with any directions of bending toward the short side or elongated side. Therefore, such composition is desirable, since the degree of freedom in designing a camera incorporating a lens increases by enabling to comply with any of directions of bending toward the elongated side and the short side direction.

Figure 7:
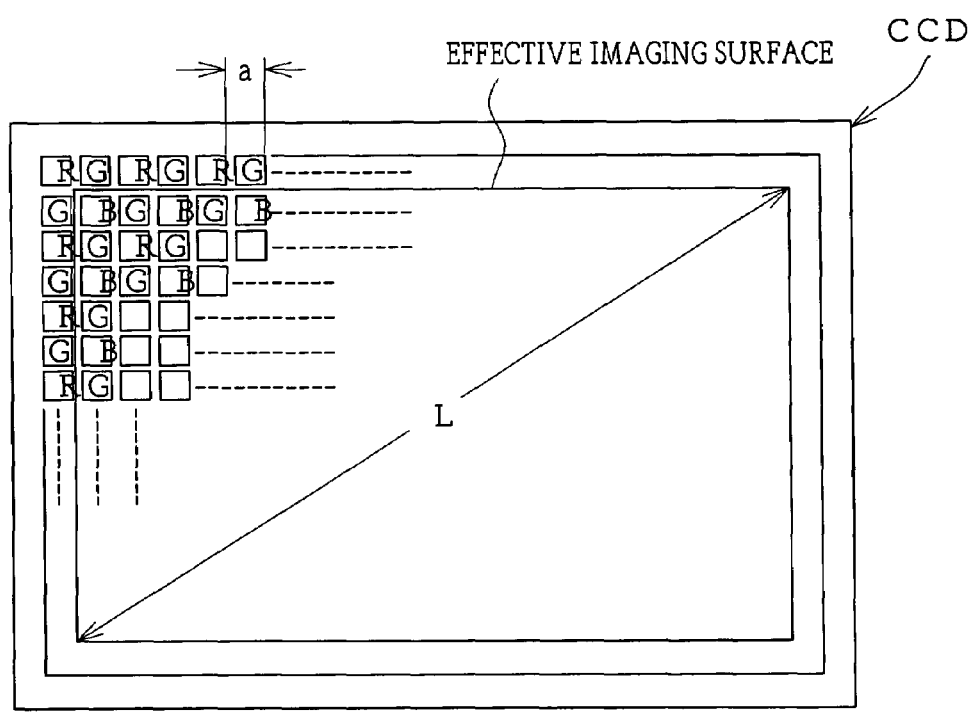
FIG. 7 is an explanatory diagram showing an example of a pixel arrangement of an electronic imaging element used in each embodiment according to the present invention.

Here, by using FIG. 7, the diagonal length L of an effective imaging surface and the pixel of a picture field of the electronic imaging element will be explained. FIG. 7 is a diagram showing an example of the pixel arrangement of the electronic imaging element used for each embodiment of the present invention, where pixels of four colors of the pixel of R (red), G (green) and B (blue), or cyanogen, magenta, yellow and green are arranged in mosaic pattern with a pixel interval a. An effective imaging surface means a domain in an photoelectric conversion surface on an imaging element used for reproduction (displaying on a personal computer, printing by a printer, etc.) of a photographed image. The effective imaging surface shown in the Figure is set on the domain narrower than an entire photoelectric conversion surface of the imaging element according to the performance (an image circle in which the performance of an optical system enables to secure) of an optical system. A diagonal length L of an effective imaging surface is the diagonal length of this effective imaging surface. Although the imaging area used for reproduction of an image can be varied, the diagonal length L of the effective imaging surface changes when the zoom lens of the present invention is used for the imaging apparatus which has such function. In such case, the diagonal length L of the effective imaging surface in the present invention is set to the maximum in the range which can be taken.

The electronic imaging apparatus using the zoom lens having bent optical path according to the present inventions can be used for a photographing apparatus in which a photographing is carried out by forming an object image using an image forming optical system and such image is received on an imaging element such as a CCD or a silver-haloid film, particularly a digital camera, a video camera and a personal computer as an example of an information processing equipment, a telephone, particularly a cellular phone convenient to carry and the like. Examples of such use will be illustrated as follows.

Figure 8:
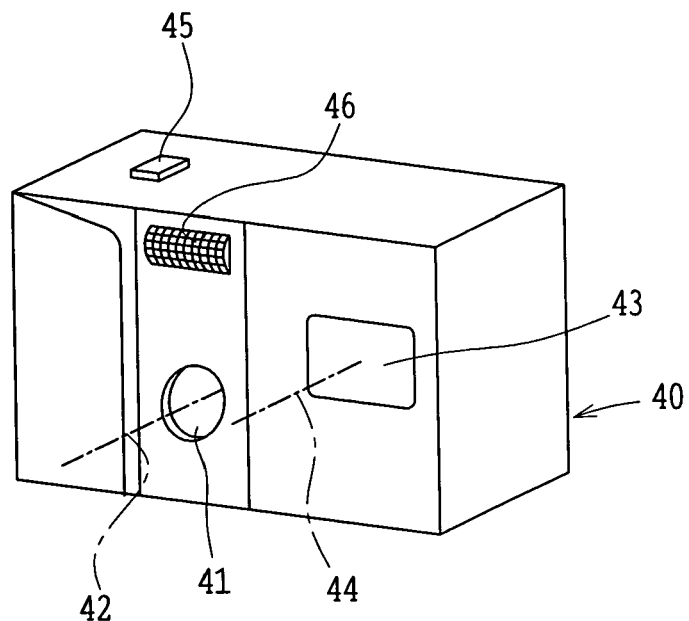
FIG. 8 is a front perspective view showing a digital camera embodied by an electronic imaging apparatus according to the present invention.
Figure 9:
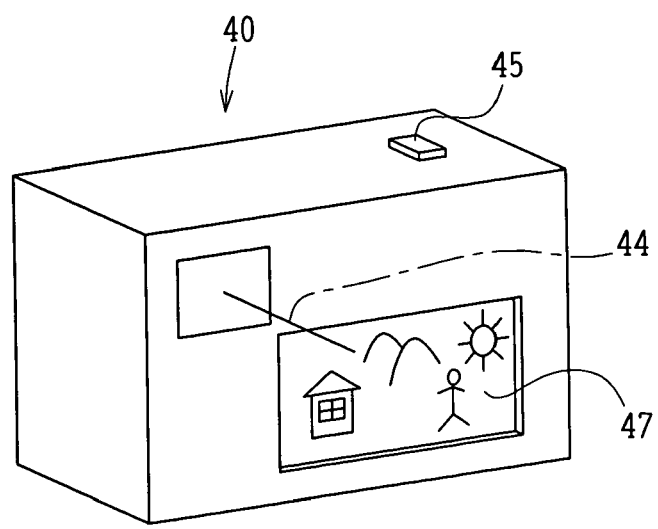
FIG. 9 is a rear perspective view showing a digital camera shown in FIG. 8.
Figure 10:
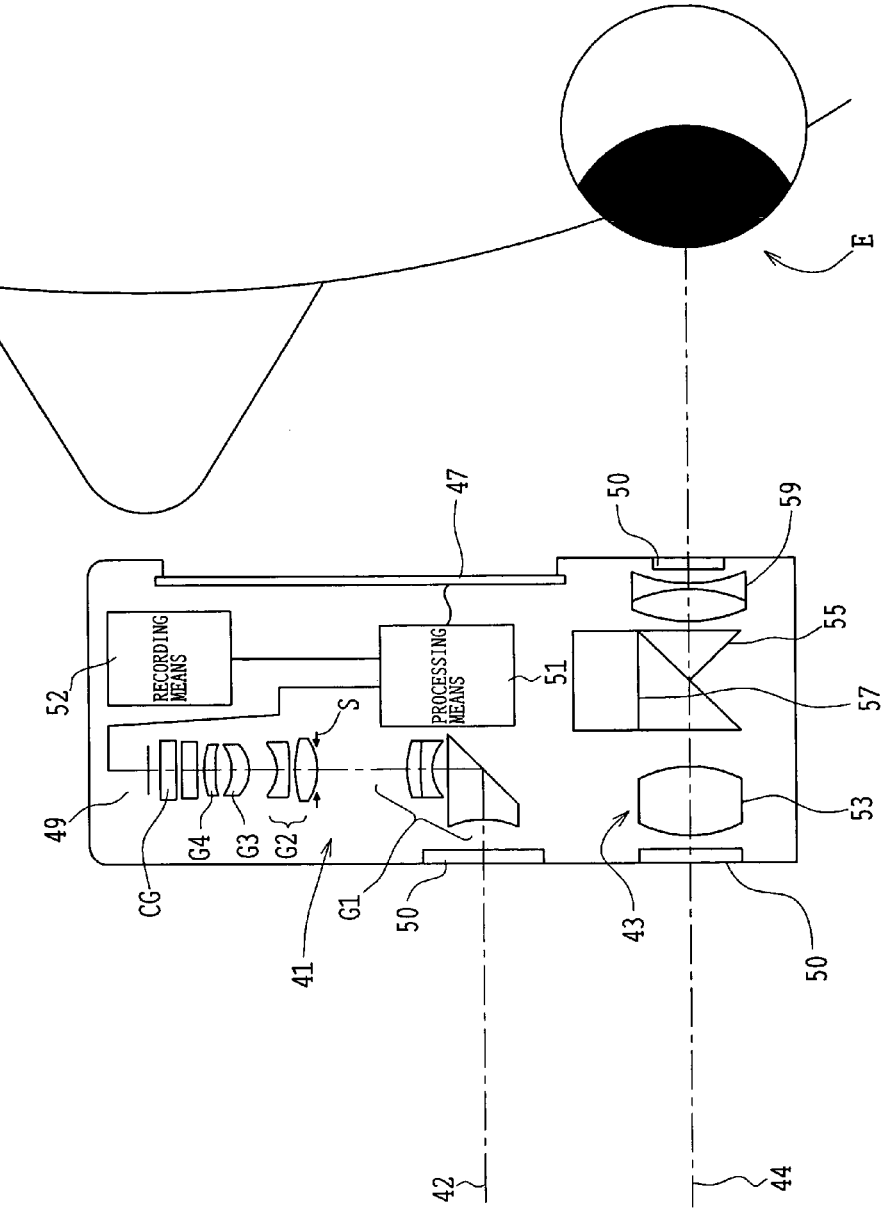
FIG. 10 is sectional drawing showing the internal composition of the digital camera shown in FIG. 8.

FIGS. 8 to 10 are conceptual diagrams showing compositions in which a zoom lens having a bent optical path according to the present invention is built in a photographing optical system 41 of a digital camera. FIG. 8 is a front perspective view showing a digital camera 40. FIG. 9 is a rear perspective view showing the same. FIG. 10 is a sectional view showing composition of the camera 40. The digital camera shown in FIG. 10 is composed such that an imaging optical path is bent toward the direction of elongated side of a finder, and in FIG. 10 an eye of an observer is shown in upper portion.

In this example, the digital camera 40 includes the photographing optical system 41 having an optical path for photographing 42, the finder optical system 43 having an optical path for finder 44, a shutter 45, a flash 46 and liquid-crystal-display-monitor 47 and so on. When the shutter 45 arranged at the upper part of the camera 40 is pressed, by interlocking it, photographing is carried out through the photographing optical system 41, for example, the optical path bending zoom lens of the first embodiment.

Then, an object image formed by the photographing optical system 41 is formed on an imaging surface of CCD 49 through a near-infrared cut coat given to a near-infrared cut filter, a CCD cover glass or other lenses.

The object image received by this CCD 49 is displayed on the liquid crystal display monitor 47 arranged on the camera back as an electronic picture through the processing means 51. The record means 52 is connected to this processing means 51, and a photographed electronic picture can also be recorded on it. This record means 52 may be formed separately from the processing means 51, and it can be composed such that record writing can be carried out electronically by using a disk such as a floppy disk (registered trademark), a memory card, MO, etc. Moreover, it may be composed as a film-based camera using a silver halide film instead of the CCD 49.

Furthermore, on the optical path 44 for the finder, an object optical system 53 for the finder is arranged. An object image formed by this object optical system 53 for the finder is formed on a visual field frame 57 of a Porro prism 55 which is an component for erecting image. Behind this Porro prism 55, an ocular optical system 59 in which an image formed into an erect image is lead to the observer's eyeball E is arranged. Cover members 50 are arranged a t an incidence side of the photographing optical system 41 and the object optical system 53 for finder and at an exit side of an ocular optical system 59 respectively.

The digital camera 40 composed in this way has an effect in thinning of a camera by having bent an optical path to the direction of elongated side direction. The zoom lens is composed such that the photographing optical system 41 has a high zooming ratio and a wide angle of view and it has good aberration, bright imaging performance and a long back focus where a filter or the like can be arranged. Accordingly and cost reduction with a high efficiency can be realized.

It can be composed such that the imaging optical path of the digital camera 40 of this embodiment is bent toward the direction of the short side of the finder. In this case, a layout for mitigating an influence of a shadow generated when a photographing a person using a stroboscope (or flash) is carried out can be achieved, by arranging the stroboscope (or flash) at separate upper portion from an incident surface of a taking lens. In the example of FIG. 10, although parallel plane boards are arranged as the cover members 50, a lens having power can be used.

Figure 11:
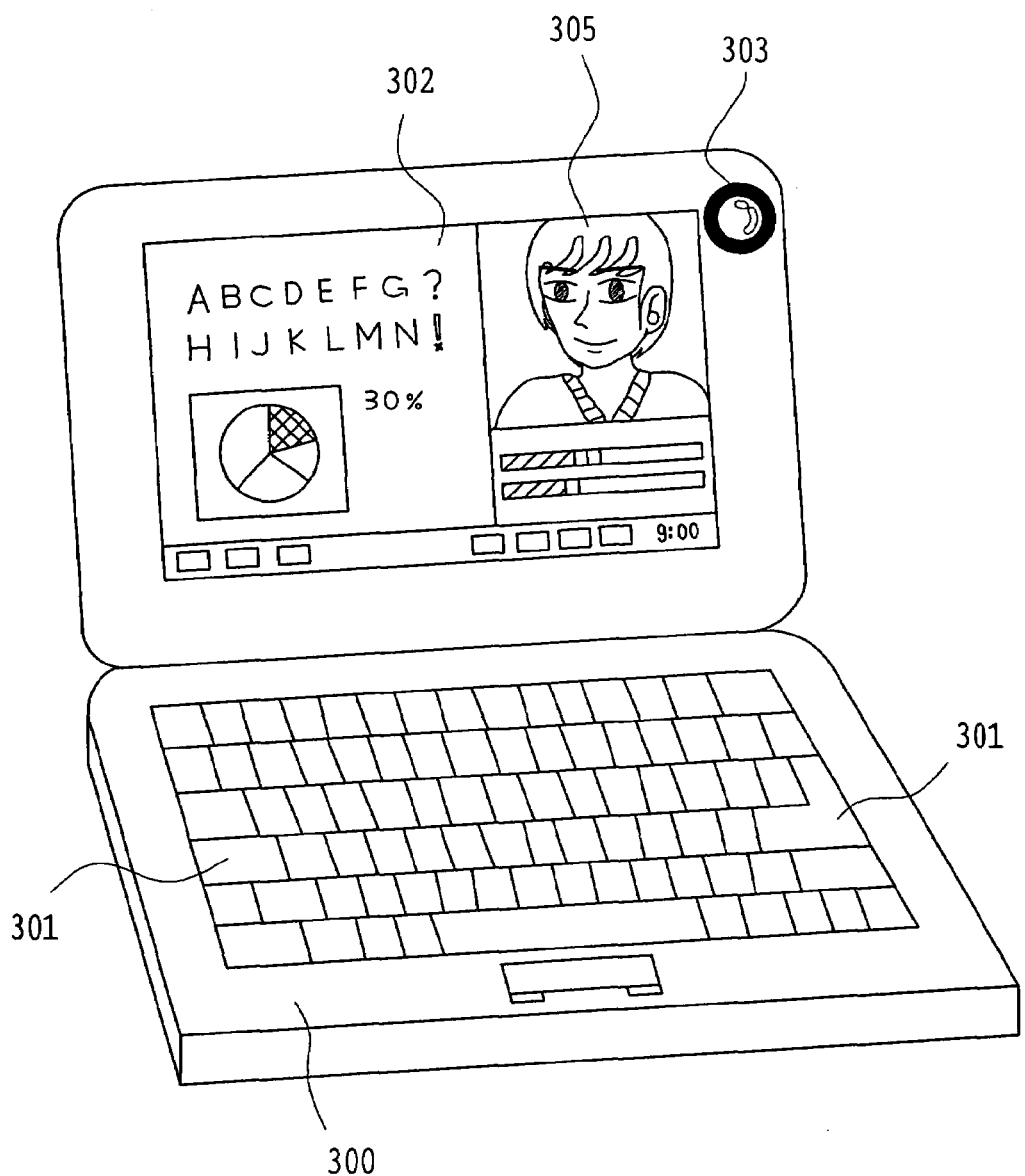
FIG. 11 is a front perspective view showing a personal computer, a cover of which is opened, equipped with an electronic imaging apparatus according to the present invention.
Figure 12:
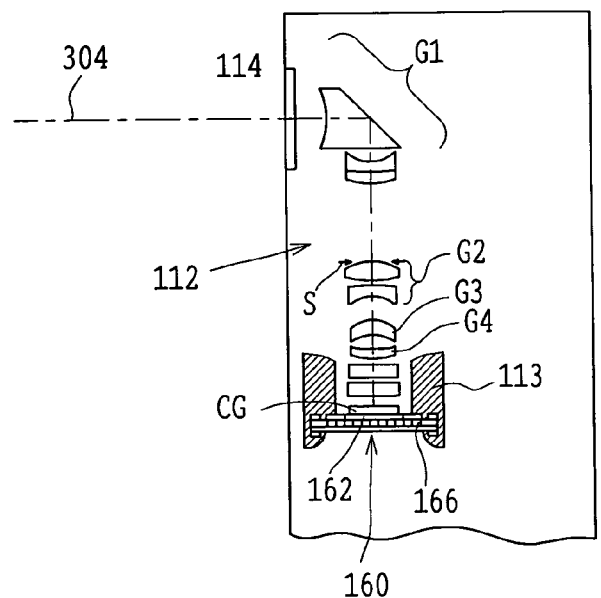
FIG. 12 is a sectional view showing a photographing optical system of a personal computer shown in FIG. 11.
Figure 13:
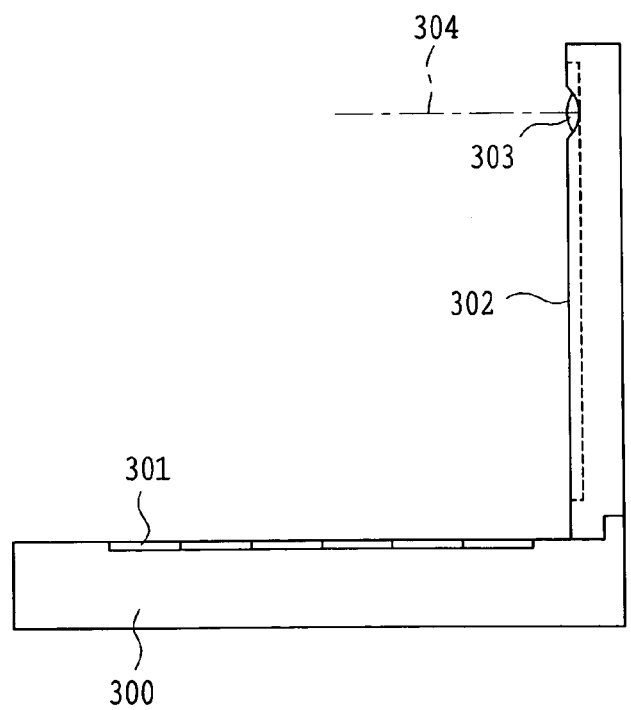
FIG. 13 is a side view showing a personal computer shown in FIG. 11.

Next, a personal computer as an example of an information processing equipment in which the zoom lens having bent optical path according to the present invention is built in as an objective optical system is shown in FIGS. 11 to 13. FIG. 11 is a front perspective view showing a personal computer, a cover of which is opened, FIG. 12 is a sectional view showing a photographing optical system 303 of the personal computer 300 and FIG. 13 is a side view of FIG. 11.

As shown in FIGS. 11 to 13, the personal computer 300 has a keyboard 301 for an operator to input information from the exterior, an information-processing means and a record means, an illustration of which was omitted, a monitor 302 for displaying information to the operator, and a photographing optical system 303 for taking photograph of the operator by himself and a surrounding image.

Here, the monitor 302 can be a penetrated type liquid-crystal-display element illuminated from the backward by the back light which is not illustrated, a reflective-liquid-crystal display element which displays by reflecting the light from frontward, CRT display, etc. In these drawings, although the photographing optical system 303 is built in upper right portion of the monitor 302, it may be arranged at not only the place mentioned above but also any portion around the monitor 302 and around the keyboard 301.

This photographing optical system 303 has, for example, an objective lens 112 composed of a zoom lens having a bent optical path shown in the first embodiment and an imaging element chip 162 for receiving an image, on the photographing optical path 304. These are built in the personal computer 300.

Here, on the imaging element chip 162, a cover glass CG is stuck additionally, which is formed in one as an imaging unit 160, and it is inserted in the back edge of a lens holding frame 113 of the objective lens 112 by one-touch action, and attaching becomes possible. Thus, centering of the objective lens 112 and the imaging element chip 162, and adjustment of distance between surfaces are unnecessary, and assembling becomes simple. Moreover, a cover glass 114 for protecting the objective lens 112 is arranged at the tip (illustration is omitted) of the lens holding frame 113. As to the drive mechanism of the zoom lens etc., in the lens holding frame 113, an illustration is omitted.

An object image received by the imaging element chip 162 is inputted via a terminal 166 into a processing means of the personal computer 300, and it is displayed on the monitor 302 as an electronic picture. In FIG. 11, a picture 305 in which an operator was photographed is shown as an example. This picture 305 can be displayed, through a processing means, on a personal computer of a communication partner from a remote place through Internet or telephone.

Figure 14A:
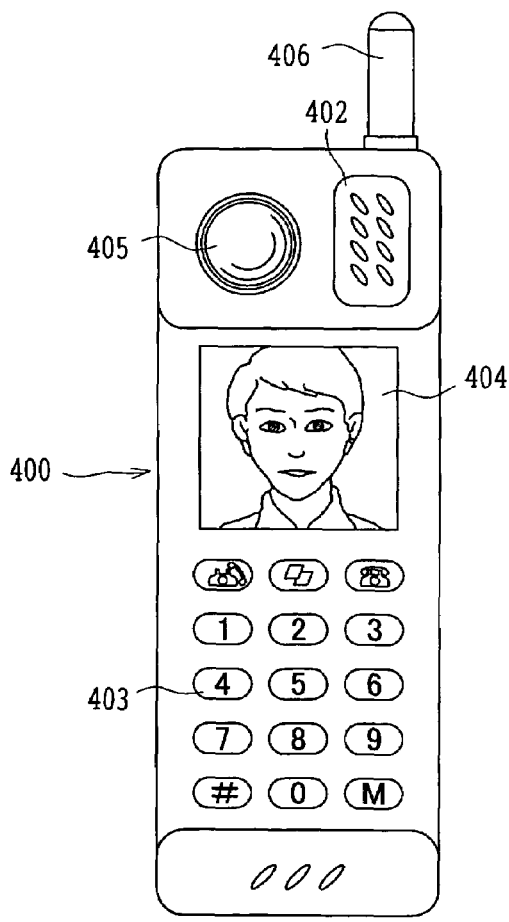
FIGS. 14A, 14B and 14C are a front view and a side view showing a cellular phone and a sectional view showing a photographing optical system equipped with an imaging apparatus according to the present invention.
Figure 14B:
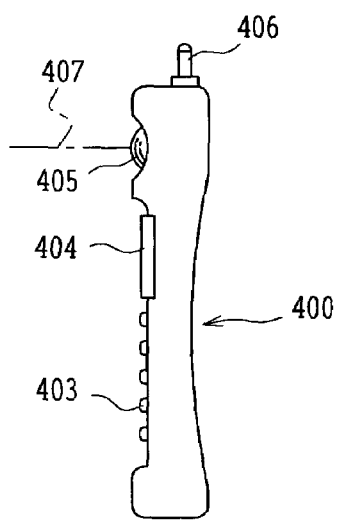
Figure 14C:
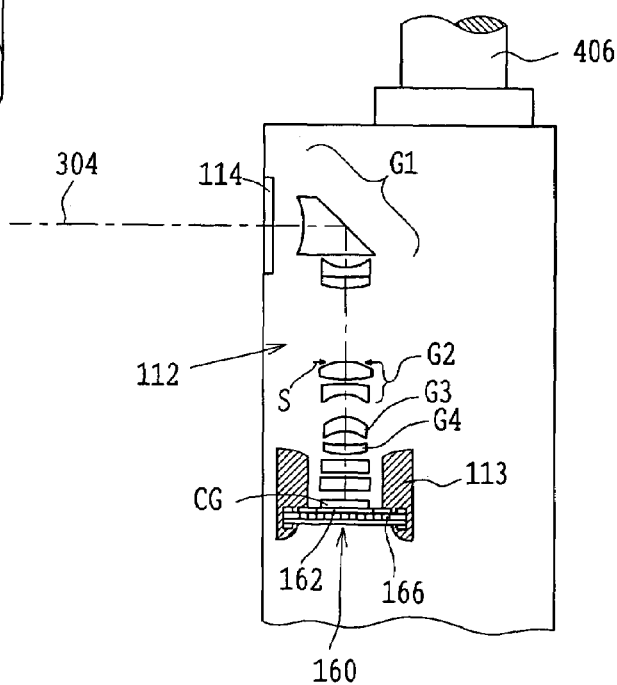

Next, a telephone, as an example of the information processing equipment in which the zoom lens having bent optical path according to the present invention is built in, particularly a cellular phone that is convenient to carry is shown in FIG. 14. FIG. 14A is a front view of the cellular phone 400, FIG. 14B is a side view of the same and FIG. 14C is a sectional view of a photographing optical system 405.

As shown in FIGS. 14A to 14C, a cellular phone 400 includes a microphone section 401 which inputs an operator's voice as information, a speaker section 402 which outputs a partner's voice of telephone communication, an input dial 403 for which the operator inputs information, a monitor 404 which displays information, such as the photographed picture of the operator himself, a partner of telephone communication etc., and a telephone number, a photographing optical system 405, an antenna 406 which performs transmission and receiving a communication electric wave, and a processing means (not shown) to process picture information, communication information, an incoming signal, etc. Here, the monitor 404 is a liquid-crystal-display element. In these drawings, an arrangement position of each composition is not restricted particularly to these. This photographing optical system 405 has, for example, the objective lens 112 composed of the zoom lens having a bent optical path shown in the first embodiment according to the present invention, which is arranged on the photographing optical path 407, and the imaging element chip 162 which receives a light of an object image. These are built in the cellular phone 400.

Here, on the imaging element chip 162, a cover glass CG is stuck additionally, which is formed in one as an imaging unit 160, and it is inserted in the back edge of a lens holding frame 113 of the objective lens 112 by one-touch action, and attaching becomes possible. Thus, centering of the objective lens 112 and the imaging element chip 162, and adjustment of distance between surfaces are unnecessary, and assembling becomes simple. Moreover, a cover glass 114 for protecting the objective lens 112 is arranged at the tip (illustration is omitted) of the lens holding frame 113. As to the drive mechanism of the zoom lens etc., in the lens holding frame 113, illustration is omitted. An object image received by the photographing element chip 162 is inputted into a processing means which is not illustrated through the terminal 166, and it is displayed as an electronic picture on the monitor 404, a monitor of a communication partner or both of them. When transmitting an image to the communication partner, the signal-processing function to convert a data on the object image received by the imaging element chip 162 into a signal which can be transmitted is included in the processing means.

What is claimed is:
1. An ectronic imaging apparatus comprising,
a photographing optical system comprising,
in order from an object side,
a first lens group having negative refracting power, which contains a reflecting component having a reflecting surface for bending an optical path of an incident light from the object side, and
at least two positive lens groups having positive refracting power, arranged at an image side of the first lens group,
wherein the photographing optical system is a zoom optical system, and
wherein the following condition is satisfied:

$$-1.75 < f1/fw < -0.8$$

where f1 is a focal length of the first lens group, and fw is a focal length at a wide angle end at the photographing optical system.

2. The electronic imaging apparatus according to claim 1, wherein the object side rather than the reflecting surface has negative refracting power.

3. The electronic imaging apparatus according to claim 1, wherein at least one of the two positive lens groups is movable on an optical axis.

4. The electronic imaging apparatus according to claim 3, wherein zooming is carried out by moving both of the two positive lens groups along different locus on the optical path.

5. The electronic imaging apparatus according to claim 4, wherein the first lens group having negative refracting power remains fixed at the time of zooming.

6. The electronic imaging apparatus according to claim 5, wherein both of the two positive lens groups are arranged at the object side at the telephoto end rather than at the wide angle end of the photographing optical system.

7. The electronic imaging apparatus according to claim 1, wherein an optical element at utmost object side has at least one ashperical surface.

8. The electronic imaging apparatus according to claim 7, wherein the optical element having the aspherical surface is composed of plastic material.

9. The electronic imaging apparatus according to claim 1, wherein a thickness of each lens on the optical axis, comprised in the photographing optical system is ⅐ or more of the diagonal length of an imaging surface.

10. The electronic imaging apparatus according to claim 9, wherein a thickness of each lens on an optical axis, comprised in the photographing optical system is ⅙ or more of the diagonal length of an imaging surface.

11. The electronic imaging apparatus according to claim 1 having a lens group consisting of only one positive lens element having at least one aspherical surface, arranged at utmost image side, besides the at least two positive lens groups.

12. The electronic imaging apparatus according to claim 11, wherein the lens group arranged at utmost image side is composed of plastic material.

13. The electronic imaging apparatus according to claim 11, wherein the lens group arranged at utmost image side satisfies the following condition.

$$6 < f4/fw < 40$$

where f4 is a focal length of the lens group at utmost image side, and fw is a focal length of the photographing optical system at the wide angle end.

14. The electronic imaging apparatus according to claim 1, wherein the number of lenses contained in one positive lens group of the two positive lens groups are two, which consists of a negative lens element and a positive lens element, and
the number of lens contained in one of the other positive lens groups is one, which consists of only one positive lens.

15. The electronic imaging apparatus according to claim 1, wherein one positive lens group of the two positive lens groups is arranged directly behind an image side of the first lens group, and
the lenses contained is composed of two lens elements which are arranged in order from the object side, a positive lens element having a convex surface directed toward the object side and a negative lens element having a concave surface directed toward the image side.

16. An electronic imaging apparatus comprising,
a photographing optical system comprising,
in order from an object side,
a first lens group having negative refracting power, which contains a reflecting component having a reflecting surface for bending an optical path of an incident light from the object side, and
at least two positive lens groups having positive refracting power, arranged at an image side of the first lens group,
wherein the photographing optical system is a zoom optical system, and
wherein a thickness of each lens on the optical axis, which is contained in the photographing optical system is ⅐ or more than a diagonal length of an imaging surface.

17. The electronic imaging apparatus according to claim 16, wherein the object side rather than the reflecting surface has negative refracting power.

18. The electronic imaging apparatus according to claim 16, wherein at least one of the two positive lens groups is movable on the optical axis.

19. The electronic imaging apparatus according to claim 18, wherein zooming is carried out by moving both of the two positive lens groups along different locus on the optical path.

20. The electronic imaging apparatus according to claim 19, wherein the first lens group having negative refracting power remains fixed at the time of zooming.

21. The electronic imaging apparatus according to claim 20, wherein both of the two positive lens groups are arranged nearer to the object side at a telephoto end rather than at a wide angle end of the photographing optical system.

22. The electronic imaging apparatus according to claim 16, wherein an optical element at utmost object side has at least one aspherical surface.

23. The electronic imaging apparatus according to claim 21, wherein the optical element having aspherical surface is composed of plastic material.

24. The electronic imaging apparatus according to claim 16, wherein the thickness of each lens on the optical axis, contained in the photographing optical system is ⅙ or more than the diagonal length of an imaging surface.

25. The electronic imaging apparatus according to claim 16, comprising a lens group consisting of only one positive lens element having at least one aspherical surface, arranged at utmost image side, besides at least the two positive lens groups.

26. The electronic imaging apparatus according to claim 25, wherein the lens group arranged at utmost image side is composed of plastic material.

27. The electronic imaging apparatus according to claim 25, wherein the lens group arranged at utmost image side satisfies the following condition.

$$6 < f4/fw < 40$$

where f4 is a focal length of the lens group arranged at utmost image side, and fw is a focal length at the wide angle end of the photographing optical system.

28. The electronic imaging apparatus according to claim 16, wherein the number of lenses contained in one of the two positive lens groups is only two, which consists of one negative lens element and one positive lens element, and the number of lens contained in one of the other positive lens groups is only one, which consists of one positive lens element.

29. The electronic imaging apparatus according to claim 16, wherein one of the two positive lens groups is arranged directly behind an image side of the first lens group, and lenses contained are composed such that in order from an object side, a positive lens element having a convex surface directed toward the object side and a negative lens element having a concave surface directed toward the image side.

30. The electronic imaging apparatus according to claim 1 or 16, wherein the reflecting component having the reflecting surface is a prism, and the following condition is satisfied.

$$1.5 < PD/L < 5.0$$

where PD is a length of an optical path of the prism and L is the diagonal length of an effective imaging area of an imaging surface.

31. The electronic imaging apparatus according to claim 1 or 16, wherein the following condition is satisfied.

$$-0.7 < f1/fT < -0.3$$

where f1 is a focal length of the first lens group, and fT is a focal length at the telephoto end of the photographing optical system.

32. An electronic imaging apparatus comprising,
a photographing optical system comprising,
in order from an object side,
a first lens group having negative refracting power, which includes a reflecting component having a reflecting surface for bending an optical path of an incident light from the object side, and
at least two positive lens groups having positive refracting power, arranged at an image side of the first lens group, wherein the following condition is satisfied:

$$-0.7 < f1/fT < -0.3$$

where f1 is a focal length of the first lens group, and fT is a focal length of the photographing optical system and it is a focal length at the telephoto end of the photographing optical system when the focal length is variable.

33. The electronic imaging apparatus according to one of claims 1, 16 and 32, wherein the following condition is satisfied:

$$-1.70 < f1/fw < -1.20$$

where f1 is a focal length of the first lens group, and fw is a focal length of a photographing optical system, and it is the focal length at the wide angle end of the photographing optical system when the focal length is variable.

34. The electronic imaging apparatus according to one of claims 1, 16 and 32, having a lens group arranged at utmost image side, besides the at least two positive lens groups, and wherein the lens group arranged at utmost image side satisfies the following condition:

$$9 < f4/fw < 25$$

where f4 is a focal length of a lens group arranged at utmost image side, and fw is a focal length of the photographing optical system and it is the focal length at the wide angle end of the photographing optical system when the focal length is variable.

35. The electronic imaging apparatus according to one of claims 1, 16 and 32, wherein a reflecting component having the reflecting surface is a prism, and the following condition is satisfied.

$$1.95 < PD/L < 3.5$$

where PD is an optical length of a prism, and L is the diagonal length of an effective imaging surface of an imaging surface.

36. The electronic imaging apparatus according to one of claims 1, 16 and 32, wherein the following condition is satisfied.

$$-0.6 < f1/fT < -0.45$$

where f1 is a focal length of the first lens group, and fT is a focal length of the photographing optical system and it is a focal length at the telephoto end of the photographing optical system when the focal length is variable.

37. The electronic imaging apparatus according to one of claims 1, 16 and 32, having a lens group arranged at utmost image side, besides the at least two positive lens groups, and wherein the lens group arranged at utmost image side satisfies the following condition:

$$2 < f4/fT < 14$$

where f4 is a focal length of the lens group arranged at utmost image side, and fT is a focal length of the photographing optical system and it is the focal length at the telephoto end of the photographing optical system when the focal length is variable.

38. The electronic imaging apparatus according to one of claims 1, 16 and 32, comprising,
in order from the object side,
the first lens group having negative refracting power which remains fixed at the time of zooming,
a second lens group having positive refracting power which moves on the optical axis at the time of zooming,
a third lens group having positive refracting power which moves on an optical axis at the time of zooming,
a fourth group having positive refracting power which remains fixed at the time of zooming, and
an optical filer,
wherein the second lens group and the third lens group are said at least two positive lens groups.

39. The electronic imaging apparatus according to claim 38, wherein focusing is carried out by moving only the third lens group in the lens groups.

* * * * *

UNITED STATES PATENT AND TRADEMARK OFFICE
CERTIFICATE OF CORRECTION

| | | |
|---|---|---|
| PATENT NO. | : 7,453,507 B2 | |
| APPLICATION NO. | : 10/857955 | |
| DATED | : November 18, 2008 | |
| INVENTOR(S) | : M. Morooka | |

It is certified that error appears in the above-identified patent and that said Letters Patent is hereby corrected as shown below:

Column 19, line 4, change "An ectronic imaging apparatus comprising," to -- An electronic imaging apparatus comprising, --.

Signed and Sealed this

Fourth Day of January, 2011

David J. Kappos
*Director of the United States Patent and Trademark Office*